(12) United States Patent
Schlüsselbauer

(10) Patent No.: US 11,796,093 B2
(45) Date of Patent: Oct. 24, 2023

(54) PLUG CONNECTION BETWEEN TWO TUBULAR WORKPIECES MADE OF CONCRETE, EACH WORKPIECE HAVING AN INNER LINER MADE OF PLASTIC

(71) Applicant: Ulrich Schlüsselbauer, Altenhof am Hausruck (AT)

(72) Inventor: Ulrich Schlüsselbauer, Altenhof am Hausruck (AT)

( * ) Notice: Subject to any disclaimer, the term of this patent is extended or adjusted under 35 U.S.C. 154(b) by 115 days.

(21) Appl. No.: 16/961,204

(22) PCT Filed: Jan. 17, 2019

(86) PCT No.: PCT/AT2019/050006
§ 371 (c)(1),
(2) Date: Jul. 9, 2020

(87) PCT Pub. No.: WO2019/148218
PCT Pub. Date: Aug. 8, 2019

(65) Prior Publication Data
US 2020/0370685 A1    Nov. 26, 2020

(30) Foreign Application Priority Data
Feb. 5, 2018   (AT) .............................. A 50105/2018

(51) Int. Cl.
*F16L 21/04* (2006.01)
*F16L 49/00* (2006.01)
*F16L 47/00* (2006.01)

(52) U.S. Cl.
CPC ............... *F16L 21/04* (2013.01); *F16L 47/00* (2013.01); *F16L 49/00* (2013.01)

(58) Field of Classification Search
CPC . F16L 25/0027; F16L 58/1009; F16L 58/185; F16L 21/035; F16L 17/073; F16L 21/04
See application file for complete search history.

(56) References Cited

U.S. PATENT DOCUMENTS 2,042,132 A * 5/1936 Treskow ............. F16L 25/0027
138/175
2,698,193 A * 12/1954 Kennison ............ F16L 25/0027
52/223.3

(Continued)

FOREIGN PATENT DOCUMENTS

DE        254199 A1    3/1977
DE       2541999 A1 *  3/1977

(Continued)

OTHER PUBLICATIONS

Espacenet Enflish abstract for DE 25 41 999 A1, Mar. 24, 1977.

(Continued)

*Primary Examiner* — Matthew Troutman
*Assistant Examiner* — Alexander T Rufrano
(74) *Attorney, Agent, or Firm* — Tiajoloff & Kelly LLP

(57) ABSTRACT

The invention relates to a plug connection between two tubular workpieces (1, 2) which are made of concrete and each of which has an inner liner (5) made of plastic, one of which forms a tip end (3) and the other a socket end (4) receiving the tip end (3), wherein the inner liners (5) have circumferential sealing flanges (12) which cover the end face (13) of the tip end (3) or the socket face (14) and wherein a joint seal (16) is provided between the sealing flanges (12). In order to provide advantageous structural conditions, it is proposed that the inner liners (5) are provided with a circumferential elastomer angled profiled section (8, 9) at the end face, which receives the circumferential edge of the inner liner (5) in an end-face profiled groove (11) of its axially parallel limb (10) and whose limb at a right angle to the axis forms the sealing flange (12).

19 Claims, 2 Drawing Sheets

(56) References Cited

U.S. PATENT DOCUMENTS

Figure 1:
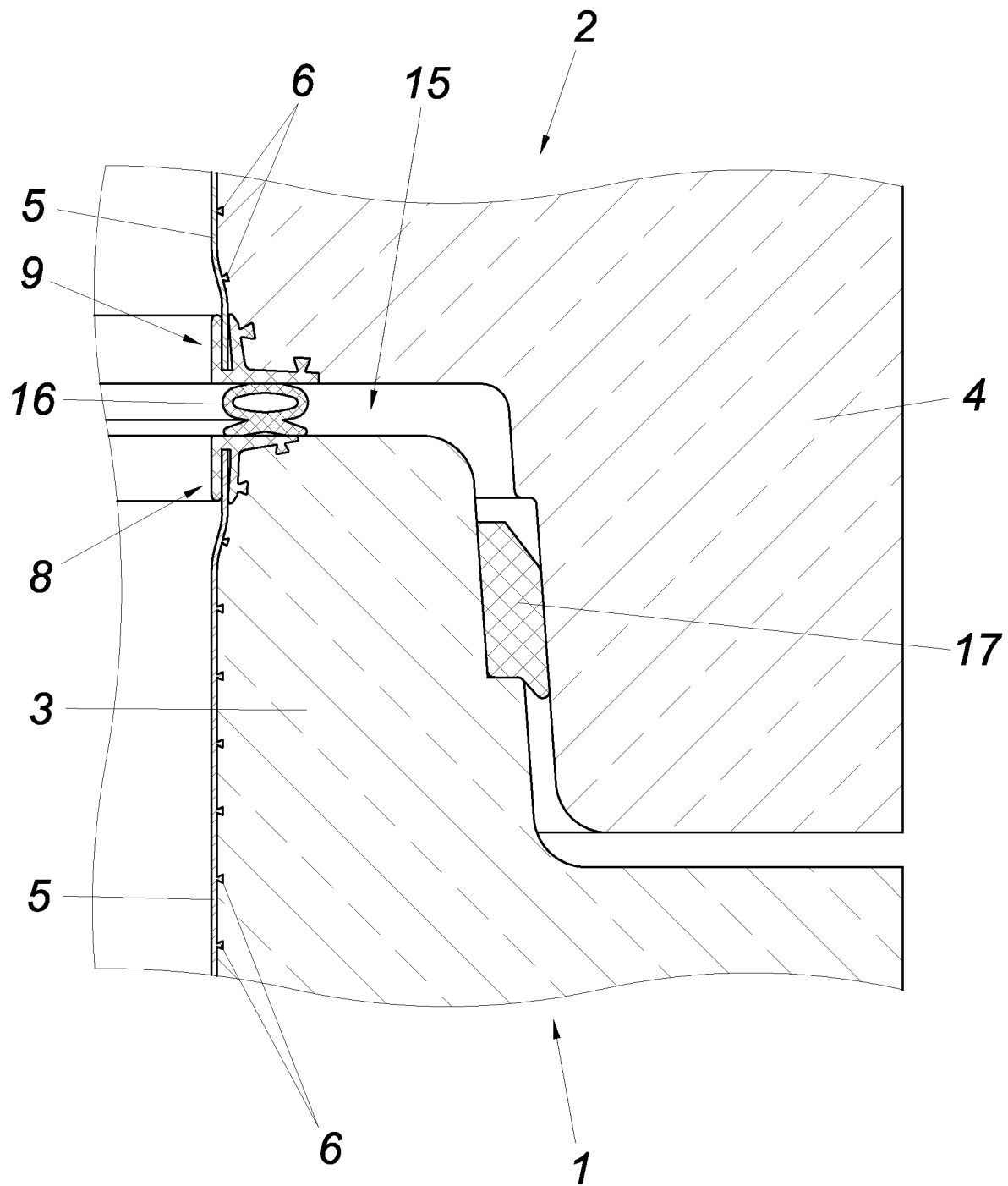

| | | | | |
|---|---|---|---|---|
| 4,909,519 | A | * | 3/1990 | Anderson .............. F16L 21/035 277/625 |
| 5,168,682 | A | * | 12/1992 | Rye .................... F16L 58/1018 52/247 |
| 6,764,105 | B1 | * | 7/2004 | Sorkin ................ F16L 25/0027 52/223.13 |
| 7,334,820 | B2 | * | 2/2008 | Fasel ........................ F16L 9/08 285/55 |
| 2005/0189763 | A1 | | 9/2005 | Fasel |
| 2021/0170628 | A1 | * | 6/2021 | Predl ...................... B28B 1/002 |

FOREIGN PATENT DOCUMENTS

| | | | | |
|---|---|---|---|---|
| DE | 2541999 | A1 | | 3/1977 |
| DE | 2804814 | A1 | | 8/1979 |
| DE | 2938366 | A | * | 4/1981 ........... E04B 1/6813 |
| DE | 2938366 | A1 | | 4/1981 |
| DE | 3114736 | A1 | | 10/1982 |
| DE | 8234849 | U1 | * | 7/1983 ............... E02B 3/16 |
| DE | G8234849.9 | U1 | | 7/1983 |
| DE | G8234849 | U1 | | 7/1983 |
| DE | 4101525 | A1 | | 8/1991 |
| DE | G9420063 | U1 | | 4/1995 |
| DE | 29706933 | U1 | * | 9/1997 ............ F16L 21/035 |
| DE | 10215059 | A1 | * | 2/2003 ............ F16L 21/035 |
| EP | 0556533 | A1 | * | 8/1938 |
| EP | 1571382 | A1 | | 9/2005 |
| JP | 62-71614 | A | | 4/1987 |
| JP | S6271614 | A | * | 4/1987 |

OTHER PUBLICATIONS

Espacenet English-language Abstract for DE 25 49 99 A1, Mar. 24, 1977.

Espacenet English-language Abstract for DE 28 04 814, Aug. 9, 1979.

Espacenet English-language Abstract for DE 29 38 66, Apr. 9, 1981.

Espacenet English-language Abstract for DE 311 47 36, Oct. 28, 1982.

Espacenet English-language Abstract for DE 410 15 25, Aug. 1, 1991.

* cited by examiner

PLUG CONNECTION BETWEEN TWO TUBULAR WORKPIECES MADE OF CONCRETE, EACH WORKPIECE HAVING AN INNER LINER MADE OF PLASTIC

FIELD OF THE INVENTION

The invention relates to a plug connection between two tubular workpieces which are made of concrete and each of which has an inner liner made of plastic, one workpiece forming a tip end and the other forming a socket end which receives the tip end, wherein the inner liners have circumferential sealing flanges which cover the end face of the tip end or the socket face and wherein a joint seal is provided between the sealing flanges.

DESCRIPTION OF THE PRIOR ART

In the case of plug connections between tubular workpieces made of concrete having an inner liner made of plastic as corrosion protection, for example between pipes or manhole rings, the difficulty arises in providing a joint seal between the inner liners which creates a corrosion-resistant connection between the inner liners of the workpieces to be connected without having to take expensive sealing measures on site.

For this purpose, it is already known that the inner liners made of a thermoplastic material in the area of the tip ends and the socket ends can be reshaped by the application of heat in such a way that radially outwardly projecting, circumferential sealing flanges are obtained, which cover the end face of the tip end or socket face after casting of the tubular concrete bodies, so that when the tip end of one of the two workpieces to be connected is inserted into the socket end of the other of the two workpieces to be connected, the sealing flanges of the tip end and of the socket end are axially opposite one another and can accommodate between them a corresponding, optionally load-transmitting joint seal which connects the two inner liners via the sealing flanges in a sealed and corrosion-resistant manner. The disadvantage, however, is the manufacturing effort required for the formation of the sealing flanges and the restriction to workpiece cross-sections with sufficiently large radii of curvature for the forming of the edge sections of the inner liners into radially protruding sealing flanges.

SUMMARY OF THE INVENTION

The invention is thus based on the object of designing a plug connection between two tubular concrete workpieces, each having an inner liner made of plastic, in such a way that a corrosion-resistant joint seal meeting all requirements can be created with a comparatively low manufacturing effort without being subject to the restrictions of predetermined minimum radii for the free flow cross-section.

Based on a plug connection of the type described above, the invention solves the object set in that the inner liners are provided with a circumferential elastomer angled profiled section at the end face, which receives the circumferential edge of the inner liner in an end-faced profiled groove of its axially parallel limb and whose limb at a right angle to the axis forms the sealing flange.

Since as a result of these measures the sealing flanges covering the end face of the tip end or socket face are formed by a limb of an elastomer angled profiled section, it is no longer necessary to take into account the deformation properties of the inner liner in order to form the sealing flanges, which not only avoids the resulting restrictions in terms of the workpiece cross-section, but also creates the conditions for simple production, because only the circumferential edge of the inner liner has to be inserted into the end-faced profiled groove of the axially parallel limb of the angled profiled section in order to provide the inner liners with sealing flanges essential for the joint seal, which cover the end faces of the tip end and the socket face of the concrete body of the tubular workpieces at least in a circumferential edge area sufficient to accommodate a joint seal.

The engagement of the circumferential edge of the inner liner in the end-face profiled groove of the axially parallel limb of the angled profiled section forms a labyrinth seal at a corresponding engagement depth, which generally excludes the penetration of aggressive media to the concrete body. The sealing effect can, however, be increased if the groove walls of the end-face profiled groove in the edge area rest under an elastic pretension against the circumferential edge of the inner liner. In addition, the edge of the inner liner can be glued at least in some areas within the profiled groove, which not only influences the sealing effect but also provides additional protection against the angled profiled section being pulled off the inner liner, although the angled profiled section will usually be anchored in the concrete body of the work piece by lugs projecting into the concrete body.

Particularly simple structural conditions are obtained if the joint seal is part of the angled profiled section of the inner liner of one of the two workpieces, i.e. it is assigned to either the angled profiled section of the tip end or the socket end of a workpiece. In this case, no separate joint seal needs to be inserted between the tip end and the socket end of the workpieces to be connected by a plug connection, which makes handling easier. This is possible because the angled profiled section is not made of a plastic material to be provided for the inner liner, but of an elastomeric material which is also suitable as a joint seal.

If the edge of the inner liner which engages in the profiled groove extends radially outwards in relation to the adjoining section of the inner liner offset by the thickness of the groove wall facing away from the concrete body of the workpieces, the surface of the axially parallel limb of the angled profiled sections which limits the flow cross-section of the tubular workpieces is in alignment with the surface of the inner liner which limits the flow cross-section, so that no constriction of the flow cross-section need be feared due to the separate additional profile. Due to the comparatively small increase in diameter of the inner liner in the area of the edge engaging in the profiled groove compared to the circumferential length, the therewith associated circumferential elongation of the inner liner can be absorbed by the elastic properties of the plastic of the inner liner, so that no separate forming of the inner liners is generally required for this.

BRIEF DESCRIPTION OF THE INVENTION

Figure 2:
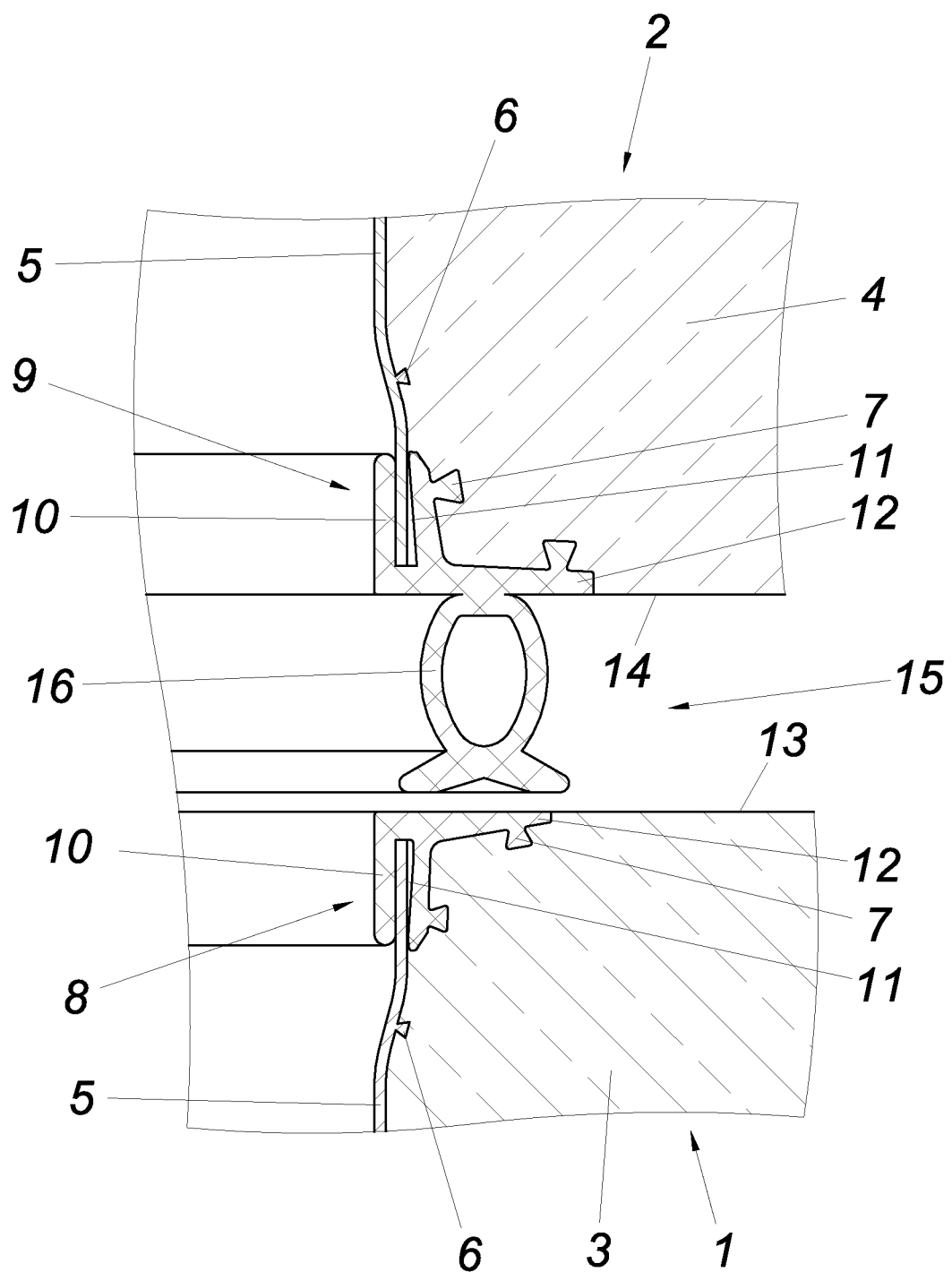

The subject matter of the invention is shown in the drawings by way of example, wherein:

FIG. 1 shows a plug connection according to the invention between the tip end and the socket end of two tubular workpieces in an axial section through the workpiece walls and FIG. 2 shows a section through the joint seal in the unloaded state immediately before the end position according to FIG. 1 on a larger scale.

DETAILED DESCRIPTION OF THE PREFERRED EMBODIMENTS

As can be seen in particular in FIG. 1, the tubular concrete workpieces 1, 2 to be connected to each other, for example pipes or manhole rings, have a tip end 3 at one end face and a socket end 4 at the opposite end face. The workpieces 1, 2 are each provided with an inner liner 5 made of plastic, which is anchored in the concrete body with anchor studs 6. At the ends, the inner liners 5 are each provided with a circumferential angled profiled section 8, 9 anchored in the concrete body by means of lugs 7 and made of an elastomeric material which, due to its elastic extensibility, can follow the flow cross-section of workpieces 1, 2 even in the area of smaller radii. As can be seen in particular from FIG. 2, the axially parallel limbs 10 of the angled profiled sections 8, 9 form a circumferential end-face profiled groove 11, into which the circumferential edge of the inner liner 5 engages. The other limb projecting radially outwards forms a sealing flange 12 which, in the case of the angled profiled section 8, covers the end face 13 of the tip end 3 and, in the case of the angled profiled section 9, in the area of the socket end 4, covers the socket face 14 in an edge area.

In the plug connection of the two workpieces 1 and 2 shown in FIG. 1, the sealing flanges 12 of the two angled profiled sections 8, 9 are thus located opposite each other with respect to the joint 15 resulting between the end face 13 of the tip end 3 and the socket face 14, so that a circumferential joint seal 16 can be provided between the sealing flanges 12, which, lying tightly against the sealing flanges 12 of the angled profiled sections 8, 9, closes the joint 15 against aggressive media flowing through the tubular workpieces 1, 2. To seal the joint 15 against external influences, an additional seal 17 can be provided between the tip end 3 and the socket end 4.

As indicated in FIG. 2, the profiled groove 11 of the angled profiled sections 8, 9 for receiving the circumferential edge of the respective inner liner 5 can surround this circumferential edge with pretension, so that a tight connection between the inner liner 5 and the angled profiled sections 8, 9 is only achieved by fitting the angled profiled sections 8, 9 onto the circumferential edge of the inner liner 5, although additional measures can be taken if necessary, e.g. by gluing the edge of the inner liner 5 into the profiled groove 11.

The production of workpieces 1, 2 for a plug connection according to the invention is simple because no deformation work is required on the inner liner 5. After the angled profiled sections 8, 9 have been fitted onto the inner liner 5 and the inner liner 5 and the angled profiled sections 8, 9 have been connected to form a circumferentially closed hollow body, this hollow body can cover the outer wall of a mold core, so that when casting the tubular workpieces between the mold core and a mold shell, the concrete body can be produced in one operation with the inner liner 5 and the angled profiled sections 8, 9, with a flow cross-section of the tubular workpieces 1, 2 which does not cause any constriction in the area of the angled profiled sections 8, 9.

As the angled profiled sections 8, 9 are made of an elastomeric material, the joint seal 16 can be assigned to one of the two angled profiled sections and be manufactured integrally therewith as shown in FIG. 2, wherein it is certainly possible to also select a different material for the joint seal.

The invention claimed is:

1. A plug connection comprising:
   two tubular workpieces made of concrete and that each has an inner liner of plastic;
   one of said tubular workpieces forming a tip end and the other of said tubular workpieces forming a socket end receiving the tip end;
   wherein the inner liners each have associated therewith respective circumferential sealing flanges that cover an end face of the tip end or a socket face of the socket end; and
   a joint seal supported between the sealing flanges; and
   wherein the sealing flanges each have a respective circumferential elastomer angled profiled section at the end face or the socket face of the associated tubular workpiece,
   said profiled section having
   a limb that extends axially parallel to an axis of the associated tubular workpiece and forms a radially inward wall, and
   an axially extending wall portion radially outward of the limb;
   said wall portion and said limb defining therebetween a profiled groove radially outward of the limb that receives a circumferential edge of the inner liner of the associated tubular workpiece therein, and
   wherein the sealing flange extends from the limb at a right angle to the axis of the tubular workpiece.

2. A plug connection according to claim 1, wherein the circumferential edge of the inner liner is glued at least in some areas within the profiled groove.

3. A plug connection according to claim 2, wherein the joint seal is formed as part of the angled profiled section of one of the two sealing flanges.

4. A plug connection according to claim 3, wherein the circumferential edge of the inner liner engaging in the profiled groove extends radially outwards offset relative to an adjoining section of the inner liner by a thickness of a groove wall facing away from concrete bodies of the workpieces.

5. A plug connection according to claim 2, wherein the circumferential edge of the inner liner engaging in the profiled groove extends radially outwards offset relative to an adjoining section of the inner liner by a thickness of a groove wall facing away from concrete bodies of the workpieces.

6. A plug connection according to claim 1, wherein the joint seal is formed as part of the angled profiled section of one of the two sealing flanges.

7. A plug connection according to claim 6, wherein the circumferential edge of the inner liner engaging in the profiled groove extends radially outwards offset relative to an adjoining section of the inner liner by a thickness of a groove wall facing away from concrete bodies of the workpieces.

8. A plug connection comprising:
   two tubular workpieces made of concrete and that each has an inner liner of plastic;
   one of said tubular workpieces forming a tip end and the other of said tubular workpieces forming a socket end receiving the tip end;
   wherein the inner liners each have associated therewith respective circumferential sealing flanges that cover an end face of the tip end or a socket face of the socket end; and a joint seal supported between the sealing flanges; and wherein the sealing flanges each have a respective circumferential elastomer angled profiled section at the end face or the socket face of the associated tubular workpiece, said profiled section having a limb that extends axially parallel to an axis of the associated tubular workpiece and forms a radially inward wall defining a profiled groove radially outward thereof that receives a circumferential edge of the inner liner of the associated tubular workpiece therein, and wherein the sealing flange extends from the limb at a right angle to the axis of the tubular workpiece; and the radially inward wall and another portion of the circumferential elastomer angled profiled section forming groove walls of the end-face profiled groove in an edge region thereof that engage under an elastic bias against the circumferential edge of the inner liner.

9. A plug connection according to claim 8, wherein the circumferential edge of the inner liner is glued at least in some areas within the profiled groove.

10. A plug connection according to claim 9, wherein the joint seal is formed as part of the angled profiled section of one of the two sealing flanges.

11. A plug connection according to claim 10, wherein the circumferential edge of the inner liner engaging in the profiled groove extends radially outwards offset relative to an adjoining section of the inner liner by a thickness of a groove wall facing away from concrete bodies of the workpieces.

12. A plug connection according to claim 9, wherein the circumferential edge of the inner liner engaging in the profiled groove extends radially outwards offset relative to an adjoining section of the inner liner by a thickness of a groove wall facing away from concrete bodies of the workpieces.

13. A plug connection according to claim 8, wherein the joint seal is formed as part of the angled profiled section of one of the two sealing flanges.

14. A plug connection according to claim 13, wherein the circumferential edge of the inner liner engaging in the profiled groove extends radially outwards offset relative to an adjoining section of the inner liner by a thickness of a groove wall facing away from concrete bodies of the workpieces.

15. A plug connection according to claim 8, wherein the circumferential edge of the inner liner engaging in the profiled groove extends radially outwards offset relative to an adjoining section of the inner liner by a thickness of a groove wall facing away from concrete bodies of the workpieces.

16. A plug connection comprising:
two tubular workpieces made of concrete and that each has an inner liner of plastic;
one of said tubular workpieces forming a tip end and the other of said tubular workpieces forming a socket end receiving the tip end;
wherein the inner liners each have associated therewith respective circumferential sealing flanges that cover an end face of the tip end or a socket face of the socket end; and
a joint seal supported between the sealing flanges; and
wherein the sealing flanges each have a respective circumferential elastomer angled profiled section at the end face or the socket face of the associated tubular workpiece,
said profiled section having a limb that extends axially parallel to an axis of the associated tubular workpiece and forms a radially inward wall defining a profiled groove radially outward thereof that receives a circumferential edge of the inner liner of the associated tubular workpiece therein, and
wherein the sealing flange extends from the limb at a right angle to the axis of the tubular workpiece; and
wherein the circumferential edge of the inner liner engaging in the profiled groove extends radially outwards offset relative to an adjoining section of the inner liner by a thickness of the radially inward wall facing away from concrete bodies of the workpieces.

17. A plug connection comprising:
a first tubular workpiece that is made of concrete and that has an inner liner of plastic and a tip end with an end face;
a second tubular workpiece made of concrete that has an inner liner of plastic and a socket end receiving the tip end, said socket end having a socket face;
first and second circumferential sealing flanges supported on the first and second tubular workpieces, respectively;
the sealing flanges each having
a respective circumferential elastomer profiled section with a limb extending away from the other of the tubular workpieces in a direction of an axis of the associated tubular workpiece; and
a respective portion extending radially outward from the limb at a right angle to the axis of the associated tubular workpiece and covering the end face or the socket face of the associated tubular workpiece;
wherein a joint seal is supported between the portions of the sealing flanges that extend radially outward from the limbs; and
wherein the limb defines a circumferential profiled groove radially outward thereof that receives therein a circumferential edge of the inner liner of the associated tubular workpiece; and
wherein the circumferential elastomer profiled section includes a groove wall portion extending generally parallel to the direction of the axis of the associated tubular workpiece radially outward of the groove and the limb;
the inner liner being received in the groove between the limb and the groove wall portion, and the limb and groove wall portion have edge regions that have an elastic bias in engagement against the circumferential edge of the inner liner.

18. A plug connection according to claim 17, wherein the elastomeric profiled section has a lug structure extending radially outward therefrom, and the associated tubular workpiece has a radially inwardly facing tapering recess, and the lug structure extends radially outwardly into said recess.

19. A plug connection comprising:
a first tubular workpiece that is made of concrete and that has an inner liner of plastic and a tip end with an end face;
a second tubular workpiece made of concrete that has an inner liner of plastic and a socket end receiving the tip end, said socket end having a socket face;
first and second circumferential sealing flanges supported on the first and second tubular workpieces, respectively;
the sealing flanges each having
a respective circumferential elastomer profiled section with a limb extending away from the other of the tubular workpieces in a direction of an axis of the associated tubular workpiece; and a respective portion extending radially outward from the limb at a right angle to the axis of the associated tubular workpiece and covering the end face or the socket face of the associated tubular workpiece;

wherein a joint seal is supported between the portions of the sealing flanges that extend radially outward from the limbs; and wherein the limb defines a circumferential profiled groove radially outward thereof that receives therein a circumferential edge of the inner liner of the associated tubular workpiece;

wherein the limb has a radial thickness and defines a radially inward-facing surface inward of the groove, and wherein the circumferential edge of the inner liner that is received in the profiled groove extends into the groove radially outwardly offset relative to an adjoining section of the inner liner by the radial thickness of the limb such that an inward-facing surface of the inner liner is in alignment with the inward-facing surface of the limb.

* * * * *